United States Patent [19]

Weinrotter et al.

[11] 3,837,835

[45] Sept. 24, 1974

[54] PREPARATION OF NON-DUSTING AND NON-CAKING GRANULAR FERTILISERS

[75] Inventors: Ferdinand Weinrotter, Linz/Donau; Walter Muller, Leonding near Linz/Donau; Wilfried Krulla, Doppl near Linz/Donau; Gerhard Stern, Linz/Donau, all of Austria

[73] Assignee: Osterreichische Stickstoffwerke Aktiengesellschaft, Linz/Donau, Austria

[22] Filed: Oct. 20, 1972

[21] Appl. No.: 299,360

[30] Foreign Application Priority Data
Oct. 28, 1971 Germany............................ 2153789
Oct. 25, 1971 Austria ................................ 9193/71

[52] U.S. Cl..................... 71/59, 71/64 E, 252/384, 423/396
[51] Int. Cl................................................ C05c 1/00
[58] Field of Search .......... 71/93, 64 E, 64 G, 64 F, 71/59; 252/384; 117/100 B; 423/396; 149/46

[56] References Cited
UNITED STATES PATENTS

| 1,793,420 | 2/1931 | Block................................. 252/383 |
|---|---|---|
| 2,140,375 | 12/1938 | Allen et al....................... 252/384 X |
| 2,155,499 | 4/1939 | Lawson ................................ 71/64 F |
| 2,288,410 | 6/1942 | Lippman......................... 252/384 X |
| 2,423,450 | 7/1947 | Heald.............................. 252/384 X |
| 2,792,295 | 5/1957 | Wright................................ 71/64 G X |
| 2,909,420 | 10/1959 | Gysin et al........................... 71/93 X |
| 3,202,501 | 8/1965 | Petersson et al................ 252/384 X |
| 3,219,433 | 11/1965 | Brewster et al. ..................... 71/64 F |
| 3,276,857 | 10/1966 | Stansbury et al.................... 71/64 E |
| 3,306,730 | 2/1967 | Malmberg ........................... 71/64 E |
| 3,388,990 | 6/1968 | Maruta et al. .................. 252/384 X |
| 3,526,622 | 9/1970 | Varsanyi......................... 252/384 X |
| 3,672,945 | 6/1972 | Taylor.............................. 71/64 G X |
| 3,692,529 | 9/1972 | Rychman............................ 71/64 G |
| 3,697,245 | 10/1972 | Dilday................................. 71/64 E |

Primary Examiner—Frank A. Spear, Jr.
Assistant Examiner—Richard Barnes
Attorney, Agent, or Firm—Wenderoth, Lind & Ponack

[57] ABSTRACT

Granules of fertiliser based on ammonium nitrate are conditioned to make them non-dusting and non-caking by applying to the surface of the granules a protective coating of a substituted s-triazine derivative.

14 Claims, No Drawings

PREPARATION OF NON-DUSTING AND NON-CAKING GRANULAR FERTILISERS

The present invention relates to the preparation of non-dusting, non-caking, granular fertilisers containing ammonium nitrate, as, for example, calcium ammonium nitrate (calcium carbonate containing ammonium nitrate) and N : P : K — fertilisers and particularly to a process which involves treating the surface of the fertiliser granules with certain amino-triazine derivatives. The invention is also concerned with the resulting fertiliser compositions. Various processes are already known for conditioning fertiliser granules by application of organic substances of mixtures thereof with inorganic substances, to the surface of the granules.

Thus, for example, according to Belgian Patent Specification No. 652,773 and according to German Offenlegungsschrift 2,037,647 fatty amines are employed, inter alia mixed with powdery substances, such as kaolin, the surface-active effect of the fatty amines being utilised.

These compounds have the disadvantage that they cannot be used to achieve a longer-lasting completely dust-free conditioning. Dust from silos in which a fertiliser treated in this way is stored shows a great enrichment in organic substance. Since short-chain amines are additionally toxic, only those with long carbon chains, and which are therefore correspondingly more expensive, may be used. A further disadvantage is that alkylamines in combination with oil cause large swelling of the conveyor belts, as a result of which these become unuseable quickly. Other processes, for example according to DP 1,115,100 or according to Austrian Patent 245,543 also employ compounds having a surface-active effect for conditioning. However, both the hydrazine or guanidine compounds described therein, and the substituted s-triazine derivatives, may be manufactured only in a relatively complicated manner involving several steps and are therefore uneconomical. These compounds therefore have found practically no application.

According to other processes the feriliser granules may be coated with polymers, starting from appropriately polymerisable compounds. Such processes have been published, for example, in DAS 1,467,381 and in German Offenlegungsschriften 1,467,385; 1,467,386 and 1,905,834 Our experiments with appropriate commercial products have shown that the conditioning effect in these cases, however, is unsatisfactory.

Surprisingly, it has now been found that certain s-triazines, which are very simply accessible, though lacking surface-active properties, are excellent conditioning agents for fertilisers based on ammonium nitrate and because of their lower basicity have no harmful effect on the fertiliser particles. When used in an oil medium, significantly less attack on rubber, for example of conveyor belts, is also noted.

Thus according to the present invention there is provided a process for the preparation of a non-dusting and non-caking granular fertiliser containing ammonium nitrate, which comprises adding to granules of said fertiliser a substituted s-triazine derivative of the formula (I)

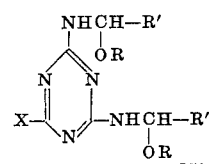

in which R is selected from the group consisting of alkyl, having one to six carbon atoms, isoalkyl having one to six carbon atoms and alkenyl having two to six carbon/atoms, R' is selected from the group consisting of alkyl having one to six carbon atoms and isoalkyl having one to six carbon atoms and X is selected from the group consisting of hydrogen, amino, aklyl having one to four carbon atoms, phenyl and the group

wherein R and R' are as defined above, whereby a protective coating on the surface of the granules is formed.

Particularly good results are achieved with bis-isoalkylolmelamine-alkyl-ethers, above all with bis-isobutyl-olmelamine-alkyl-ether, which possesses the economic advantage that isobutyraldehyde, which arises as a by-product in various processes, may be utilised for its preparation. It is, however, also possible successfully to employ bis-ethylol-melamine- or bis-propylolmelamine-alkyl-ethers, for example N,N-bis-propylolmelamine-isobutyl-ether. Furthermore, it is also possible to use the corresponding tris-isoalkylolmelamine-alkyl-ethers, for example, N,N', N''-tris-isobutylolmelamine-methyl-ether and the 2,4-bis-(1-alkoxyalkylamino)-6-alkyl-s-triazines, for example 2,4-bis-(1-methoxyisobutylamino)-6-methyl-s-triazine, for the purpose according to the invention.

The conditioning agent may be applied in the solid form, as a powders to the granules. The amount of conditioning agent used is preferably 0.01 to 0.4 percent by weight relative to the granules. The conditioning agent also may be applied after first spraying the cold granules with an oil of suitable viscosity or after spraying fused paraffin on to hot granules. It has proved particularly advantageous to apply the compounds of formula (I) in an oil suspension or paraffin suspension, preferably in the ratio of 1 : 1, if appropriate with addition of suitable dispersing agents. As dispersing agents it is possible to use, in the present system, for example, not only the alkali metal salts but also the alkaline earth metal salts of higher fatty acids, for example sodium stearate or calcium stearate. These compounds are employed in amounts of from 0.5 to 5 percent by weight relative to the total amount of conditioning agent/oil or conditioning agent/paraffin dispersion.

The compounds of the general formula (I) may be prepared in a single-stage reaction from s-triazine derivatives of the general formula:

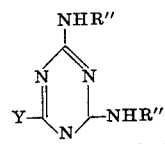

(II)

wherein Y is a hydrogen atom, an alkyl group containing up to four carbon atoms, a phenyl group or an amino group, R'' is a hydrogen atom or a group of the formula

wherein R and R' are the same as defined in formula (I). If Y is not an amino group, at least one R'' is a hydrogen atom. The compound of formula (II) is reacted, at elevated temperature and in the presence of an inorganic or organic acid as catalyst, with at least ½ mol excess, relative to the amount equivalent to the number of

groups to be introduced, of an aldehyde of the general formula

wherein R' is as defined above, and with at least 1 mol excess over the amount equivalent to the number of

groups to be introduced, of a primary or secondary saturated or unsaturated alcohol of the general formula:

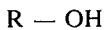

in which R is as defined above.

The conditioning process according to the invention is illustrated by the following Examples.

EXAMPLE 1

0.15 percent of a suspension of 1 part by weight of N,N'-bis-isobutylolmelamine-methyl-ether in 1 part by weight of paraffin of melting point 50° to 55°C. is sprayed on to granulated calcium ammonium nitrate, containing 26 percent of nitrogen, at a temperature of 30° to 40°C. in a powdering drum. The distribution may be checked by adding a brightener which fluoresces in UV-light (0.025 percent relative to the finished conditioning agent).

The calcium ammonium nitrate conditioned in this way was subjected to a sack storage test in comparison with a calcium ammonium nitrate powdered with 1 percent of calcium carbonate. After six months' storage time under a load of 1000 kg per sack weighing 50 kg, the calcium ammonium nitrate conditioned according to the invention was free-flowing whereas the calcium ammonium nitrate conditioned with 1 percent of calcium carbonate had formed a solid lump. The calcium ammonium nitrate used for the experiment contained 0.20 percent of water and 0.18 percent of calcium nitrate.

The N,N'-bis-isobutylolmelamine-methyl-ether used for the conditioning was obtained by reaction of 0.4 mol of melamine, 1.2 mols of isobutyraldehyde and 6.2 mols of methanol in the presence of p-toluenesulphonic acid at a reaction temperature of 64°C. It had a melting point of 231° to 234°C.

EXAMPLE 2

Granulated calcium ammonium nitrate containing 26 percent of nitrogen is sprayed at a temperature of 25° to 35°C., with 0.07 percent of spindle oil on entering the powdering drum and is powdered with 0.08 percent of N,N'-bis-isobutylolmelamine-isobutylether after passing through one third of the powdering drum. At the same calcium nitrate content and water content of the calcium ammonium nitrate as in Example 1, the calcium ammonium nitrate remains free-flowing during the course of six months' storage under a load of 1000 kg/sack.

EXAMPLE 3

Prills of a 1:1 mixture of N,N'-bis-isobutylolmelamine-methyl-ether and a mixture, melting at 70°C., of natural and synthetic paraffin, are added in an amount of 0.15 percent by weight relative to the calcium ammonium nitrate, to granular calcium ammonium nitrate containing 26 percent of nitrogen, at a temperature of 105°C., as the nitrate enters the cooling drum. The absorption may be checked, as in Example 1, by adding a fluorescent compound. The calcium ammonium nitrate, containing less than 0.2 percent of calcium nitrate and water, remains free-flowing over the course of six months storage under a load of 1000 kg. per sack.

EXAMPLE 4

0.20 percent of a suspension consisting of 40 percent of N,N'-bis-isobutylolmelamine-methyl-ether, 2 percent of sodium stearate and 58 percent of spindle oil are sprayed on to a 15:15:15 NPK fertiliser at a temperature of 40°C. At a water content of 0.9 percent, the fertiliser remains free-flowing over the course of three months storage under a load of 1000 kg/sack. Conditioning with 0.20 percent of a 35 percent strength solution of tallow fatty amine in oil and 0.5 percent of Kieselguhr on the other hand leads to a partly caked product.

EXAMPLE 5

In this laboratory test, the fertiliser to be tested is exposed to a load of 0.3 kg/cm$^2$ corresponding to 1000 kg. per 50 kg. sack, and after a certain time the load required to tear out a small sheet embedded in the fertiliser is determined. The time of exposure is so chosen that there are good possibilities of comparison. The greater is the weight required for tearing out, the lower is the conditioning effect.

| Nature and treatment of the granules | Weight required for tearing out, in g., after 65 hrs. |
|---|---|
| Calcium ammonium nitrate after emptying from the cooling drum, untreated | 1,790 |
| Calcium ammonium nitrate after cooling drum, sprayed with 0.07% of spindle oil and powdered with: | |
| 0.08% of N,N'-bis-isobutylolmelamine-methyl-ether | <250 |
| 0.08% of N,N'-bis-isobutylolmelamine-ethyl-ether | <250 |

-Continued

| Nature and treatment of the granules | Weight required for tearing out, in g., after 65 hrs. |
| --- | --- |
| 0.08% of N,N'-bis-isobutylolmelamine-propyl-ether | <250 |
| 0.08% of N,N'-bis-isobutylolmelamine-isopropyl-ether | <250 |
| 0.08% of N,N'-bis-isobutylolmelamine-butyl-ether | 250 |
| 0.08% of N,N'-bis-isobutylolmelamine-isobutyl-ether | 250 |
| 0.08% of N,N'-bis-isobutylolmelamine-isoamyl-ether | 270 |
| 0.08% of N,N'-bis-isobutylolmelamine-allyl-ether | 250 |
| 0.08% of N,N',N''-tris-isobutylol-melamine-methyl-ether | <250 |
| 0.08% of N,N'-bis-propylolmelamine-isobutyl-ether | <250 |

What we claim is:

1. A process for the preparation of a non-dusting and non-caking ammonium nitrate containing granular fertilizer which comprises adding to said ammonium nitrate containing granular fertilizer a substituted s-triazine derivative of the formula

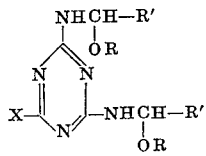

in which R is selected from the group consisting of alkyl, having one to six carbon atoms, isoalkyl having one to six carbon atoms and alkenyl having two to six carbon/atoms, R' is selected from the group consisting of alkyl having one to six carbon atoms and isoalkyl having one to six carbon atoms and X is selected from the group consisting of hydrogen, amino, alkyl having one to four carbon atoms, phenyl and the group

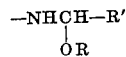

wherein R and R' are as defined above, whereby a protective coating on the surface of the granules is formed.

2. A process according to claim 1, in which the amount of the substituted s-triazine derivative added to the granules is 0.01 to 0.4 percent by weight relative to the granules.

3. A process according to claim 1, in which the substituted s-triazine derivative is added after first spraying the granules with an oil of suitable viscosity.

4. A process according to claim 3, in which the oil is spindle oil.

5. A process according to claim 3, in which the weight ratio of substituted s-triazine derivative: oil is 1 : 1.

6. A process according to claim 1, in which the substituted s-triazine derivative is added as a suspension in oil.

7. A process according to claim 6, in which the weight ratio of substituted s-triazine to oil is 1 : 1.

8. A process according to claim 6, in which the suspension contains a dispersing agent selected from the group consisting of an alkali metal salt and an alkaline earth metal salt of a higher fatty acid.

9. A process according to claim 6, in which the suspension contains a dispersing agent selected from the group consisting of an alkali metal salt and an alkali earth metal salt of a higher fatty acid in an amount of 0.5 to 5 percent by weight relative to the suspension in oil.

10. A process according to claim 1, in which the s-triazine derivative is suspended in molten paraffin and is added to the granules while they are still hot.

11. A process according to claim 10, in which the weight ratio of substituted s-triazine derivative to molten paraffin is 1 : 1.

12. A process according to claim 10, in which a dispersing agent selected from the group consisting of an alkali metal salt and an alkaline earth metal salt of a higher fatty acid is added to the paraffin suspension.

13. A process according to claim 10, in which a dispersing agent selected from the group consisting of an alkali metal salt and an alkali earth metal salt of a higher fatty acid is added in an amount of 0.5 to 5 percent by weight relative to the paraffin suspension.

14. A non-dusting and non-caking ammonium nitrate containing granular fertilizer comprising an ammonium nitrate containing granular fertilizer coated with a substituted s-triazine derivative of the formula

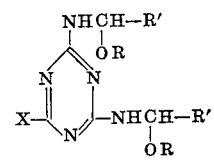

in which R is selected from the group consisting of alkyl, having one to six carbon atoms, isoalkyl, having one to six carbon atoms and alkenyl having two to six carbon atoms, R' is selected from the group consisting of alkyl having one to six carbon atoms and isoalkyl having one to six carbon atoms, X is selected from the group consisting of hydrogen, amino, alkyl having one to four carbon atoms, phenyl and the group

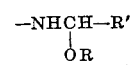

wherein R and R' are as defined above.

* * * * *